Patented Feb. 19, 1946

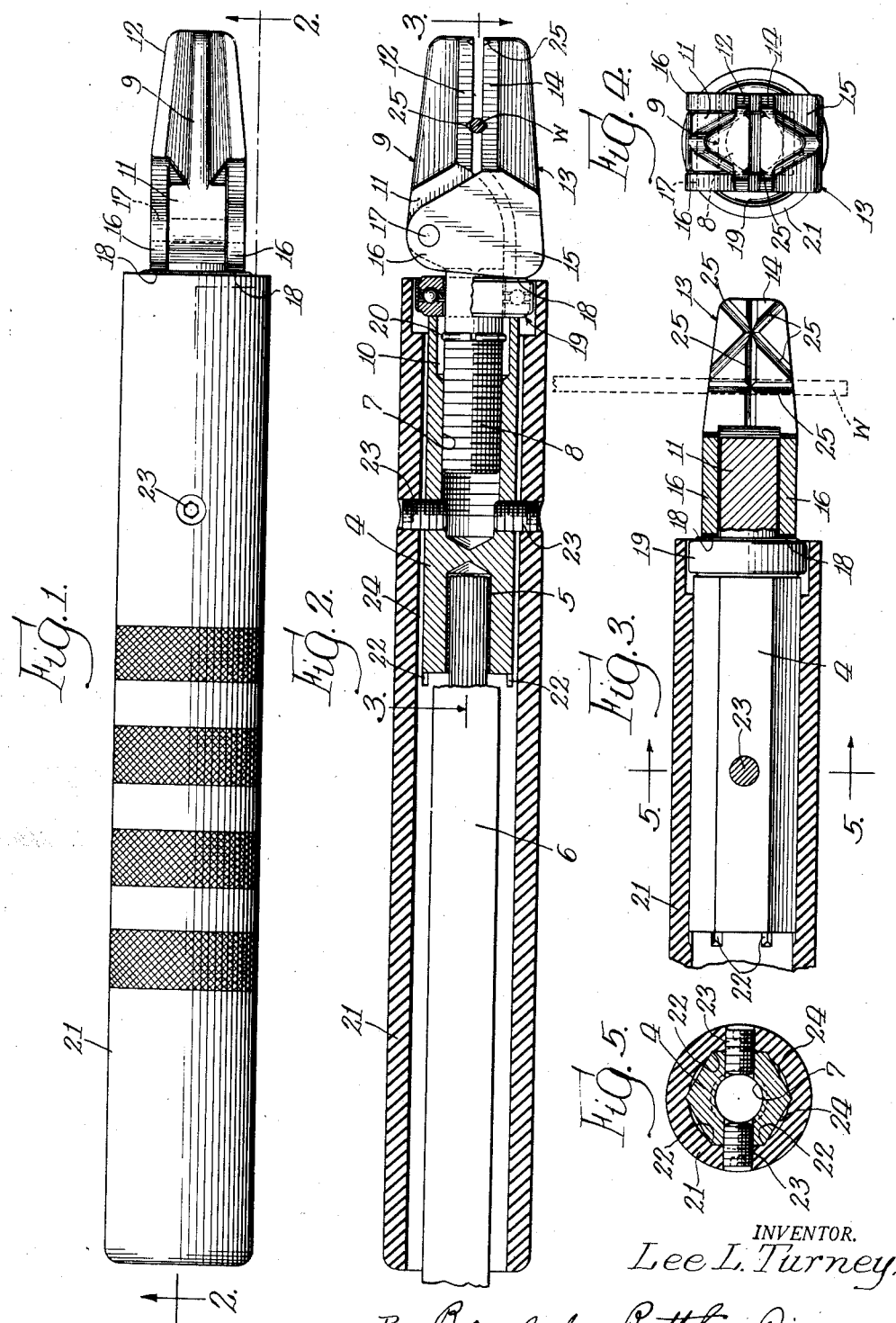

2,395,358

UNITED STATES PATENT OFFICE 2,395,358

WELDING ROD HOLDER

Lee L. Turney, Spring Lake, Mich., assignor to The Kaydon Engineering Corporation, Muskegon, Mich., a corporation of Michigan Application August 2, 1944, Serial No. 547,679

7 Claims. (Cl. 219—8)

My invention relates to welding equipment and particularly to an improved electrode holder. Its object is to provide such a device which is of simple and sturdy structure, of light weight, efficient electrically, and of easy and safe handling, without external projections likely to interfere with dexterous manipulation and with employment for welding in places difficult of access.

Other objects will be made point of as this description proceeds.

A device embodying my invention is illustrated in the accompanying drawing in which—

Figure 1 is a plan view;

Figure 2 is a longitudinal vertical view, mainly in section, taken on the planes of the line 2—2 of Figure 1, looking in the direction indicated by the arrows;

Figure 3 is a partial horizontal view, mainly in section, taken on the plane of the line 3—3 of Figure 2, looking downwardly as indicated by the arrows;

Figure 4 is an end view from the right of the other figures; and

Figure 5 is a cross sectional view taken on the plane of the line 5—5 of Figure 3, looking in the direction indicated by the arrows.

The heart of the device is in the form of a socket member 4, for instance of brass or bronze, of substantial and uniform polygonal cross-section throughout its length. At its rear end this member 4 is provided with a socket 5 for receiving the stripped stranded end of an insulated electrical lead cable 6, the socket being preferably tinned for the reception of anchoring solder, thus holding the end of the cable firmly in the socket with good electrical contact.

The forward end of the socket member 4 is provided with a bore 7 which is threaded for the reception of the threaded stem 8 of a removable clamping head or "stinger," this threaded stem being formed integrally with the male clamping member 9. The bore 7 is enlarged at the forward end, as indicated at 10, for a purpose to be described presently. The clamping member 9 comprises the hub portion 11, directly on the forward end of the stem 8, and the forwardly extending jaw 12. The female clamping member 13 comprises the jaw 14 and the hub portion 15, which is bifurcated to receive the hub portion 11 between the ears 16, 16 thus formed, and the two clamping members are pivotally joined by means of the assembly pin 17.

The rearward faces of the ears 16, 16 are formed as cam surfaces 18, 18, laterally coincident with each other, and, between them and the forward end of the socket member 4, a conventional thrust ball bearing unit 19, surrounding the stem 8, is disposed. To the immediate rear of the ball bearing unit, the stem 8 is provided with an annular groove in which a snap ring 20 is disposed, to act as a keeper for the ball bearing unit in the sub-assembly. This snap ring is located in the enlarged bore 10. It will be observed that as the socket member 4 is turned on its own axis in the proper direction, with the clamping head held against rotation, the stem 8 is drawn into the bore 7, and the ball bearing unit reduces friction to a minimum notwithstanding the considerable pressure exerted at the cam surfaces 18, 18.

A tubular handle 21, of hard rubber or other insulating material, surrounds the socket member 4, the lengthwise edges of the socket member preferably fitting in shallow grooves 22, 22 in the inner surface of the handle, the socket member being further fixed in the handle by means of set screws 23, 23. The polygonal cross-section of the socket member leaves the spaces 24, 24 for ventilation.

It will now be clear that, by turning the handle 21 relative to the clamping head, the cam surfaces 18, 18 may be forcibly engaged to swing the jaw 14 about the assembly pin 17 toward the jaw 12, so that a welding rod can be clamped between the jaws; and the welding rod, when initially inserted between the jaws can act to hold the clamping head against rotation while the handle is being turned. The juxtaposed faces of the jaws are provided with V-grooves 25, 25, alined in pairs, in order to receive a welding rod therebetween, the grooves being variously disposed so that the welding rod may be positioned either axially of the device, or cross-wise of it, or at an oblique angle one way of the other. A welding rod $w$ is shown as held between the clamping jaws, in cross-wise position, in full lines in Figure 2 and in dotted lines in Figure 3.

Although a heavy pressure may be exerted against the cam surfaces by the action of threading the socket member 4 on the stem 8, the applied force, due to the mechanical advantage of screw-threading, can be comparatively light, and, as before stated, friction in this action is kept at a minimum due to the employment of the ball bearing unit 19. At the same time, due to this arrangement, the welding rod is held between the jaws 12 and 14 with a vice-like grip.

The device is easily held in the hand of the welder, and is easily manipulated, even to places ordinarily difficult of access. There are no side levers or triggers either to operate or to interfere with handling, or to unbalance the device.

The "stinger" or clamping head is removable, by simply unscrewing the stem 8 from the bore 7, the ball bearing unit going with this sub-assembly. The handle is of such length as to give the welder a choice of grip, and, at its forward end, it is made to embrace the ball-bearing unit, as shown. When out of use, the "stinger" or clamping head removed, all metal parts are protected against accidental contact and arcing.

It will be noted that a direct metal conductor, of ample cross section, provides for current flow from cable to male clamping member, the only break in integral continuity being at the screw thread, which provides a large surface of contact, and which, due to periodic operation for renewal of welding rods, is kept bright against oxidization.

The foregoing description and the accompanying drawing are of a device which I have developed and which I set forth here as an example. It will be understood that changes and modifications can be made without departing from the spirit and scope of my invention, and that the latter are to be measured by the following claims:

1. In a welding rod holder, a member to which an electrical conductor is to be attached and having a threaded bore in from one end, a stem threaded in said bore, a clamping head carried on said stem comprising one clamping member integral with said stem and another clamping member movable relative thereto, and a thrust ball-bearing unit disposed about said stem between the end of said first named member and said movable clamping member effective for moving the latter toward said first clamping member when said stem is threaded in said bore.

2. In a welding rod holder, an elongated member of substantial cross-section having a socket at one end to receive an electrical conductor and an axial threaded bore in from the other end, a stem threaded in said bore, a clamping member formed integrally on the free end of said stem, said clamping member presenting a grooved jaw face, a second clamping member bifurcated to embrace said first-named clamping member and there pivoted to said first-named clamping member, said second clamping member presenting a grooved jaw face opposing said first-named jaw face and presenting cam surfaces to the end of said elongated member, a ball bearing unit surrounding said stem between said cam surfaces and said end of said elongated member, and a tubular handle of insulating material surrounding and fixed to said elongated member, said handle extending rearwardly beyond said elongated member and forwardly to surround said ball bearing unit.

3. In a welding rod holder, a tubular insulating handle, a member secured in said handle having a socket at one end for reception of an electrical conductor and a threaded bore extending from its other end, a stem threaded in said bore, a first clamping jaw fixed to said stem, a second opposing clamping jaw pivoted to said first jaw having at its inner end a cam surface remote from said stem, and an antifriction thrust unit surrounding said stem disposed to contact said other end of said member and said cam surface for forcing said second jaw toward said first jaw when said stem is threaded into said member.

4. In a welding rod holder, a tubular insulating handle, a member secured in said handle having a socket at one end for reception of an electrical conductor and a threaded bore extending from its other end, a stem threaded in said bore, a first clamping jaw fixed to said stem, and a second opposing clamping jaw mounted on said first jaw for movement toward and from the latter, said member and said second jaw having cooperating means whereby pressure is transmitted from said member to said second jaw at a point remote from said stem effective for forcing said second jaw toward said first jaw, when said stem is threaded into said member.

5. In a welding rod holder, a tubular insulating handle, a member secured in said handle having a socket at one end for reception of an electrical conductor and a threaded bore extending from its other end, a stem threaded in said bore, a first clamping jaw fixed to said stem, a second opposing clamping jaw pivoted to said first jaw for movement toward and away from the latter, and means whereby pressure is transmitted from said member to said second jaw at a point remote from said stem effective for forcing said second jaw toward said first jaw, when said stem is threaded into said member.

6. In a welding rod holder, a member to which an electrical conductor is to be attached having a threaded bore extending from one end, a stem threaded in said bore, a first clamping jaw fixed to said stem, and a second opposing clamping jaw mounted on said first jaw for movement toward and from the latter, said member and said second jaw having cooperating means whereby pressure is transmitted from said member to said second jaw at a point remote from said stem effective for forcing said second jaw toward said first jaw, when said stem is threaded into said member.

7. In a welding rod holder, a member to which an electrical conductor is to be attached having a threaded bore extending from one end, a stem threaded in said bore, a first clamping jaw fixed to said stem, a second opposing clamping jaw pivoted to said first jaw for movement toward and away from the latter, and anti-friction thrust means whereby pressure is transmitted from said member to said second jaw at a point remote from said stem effective for forcing said second jaw toward said first jaw, when said stem is threaded into said member.

LEE L. TURNEY.